Figure 1:
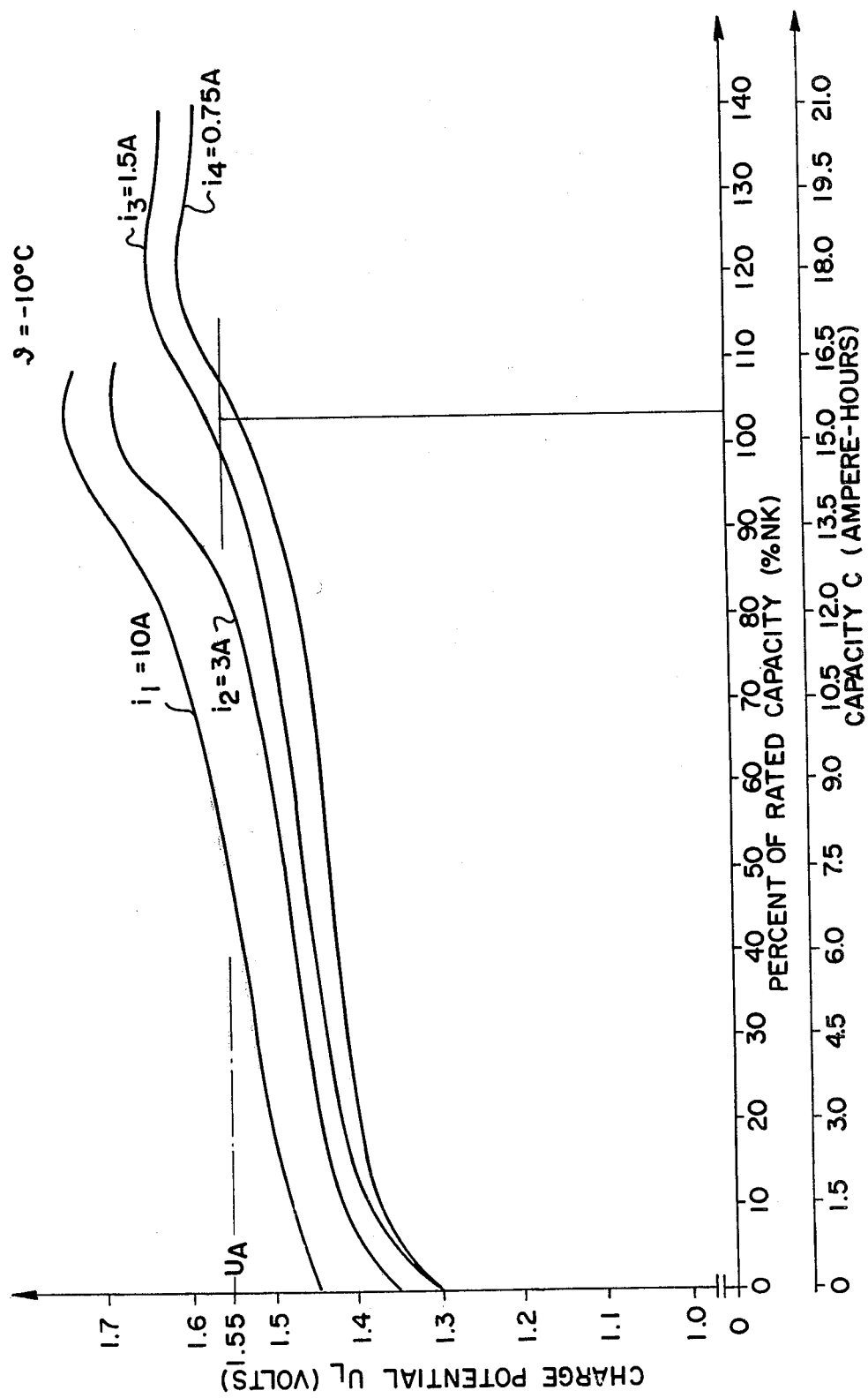

United States Patent [19]

Köthe et al.

[11] 4,308,493
[45] Dec. 29, 1981

[54] CHARGING OF ALKALINE STORAGE BATTERIES

[75] Inventors: Hans-Kurt Köthe, Kelkheim; Günter Strasen, Neu-Isenburg, both of Fed. Rep. of Germany

[73] Assignee: VARTA Batterie Aktiengesellschaft, Fed. Rep. of Germany

[21] Appl. No.: 823,666

[22] Filed: Aug. 11, 1977

[30] Foreign Application Priority Data

Aug. 11, 1976 [DE]  Fed. Rep. of Germany ....... 2636034

[51] Int. Cl.³ .............................................. H02J 7/04
[52] U.S. Cl. ...................................... 320/35; 320/32; 320/39
[58] Field of Search ...................... 320/35, 36, 39, 32, 320/40

[56] References Cited

U.S. PATENT DOCUMENTS

| 2,715,710 | 8/1955 | Godshalk et al. | 320/35 X |
| 3,614,584 | 10/1971 | Burkett et al. | 320/35 |
| 3,889,171 | 6/1975 | Hunter, Jr. | 320/35 X |
| 3,917,990 | 11/1975 | Sherman, Jr. | 320/35 |
| 4,031,450 | 6/1977 | Hammel et al. | 320/35 X |

Primary Examiner—Robert J. Hickey
Attorney, Agent, or Firm—Weiser, Stapler & Spivak

[57] ABSTRACT

Changes in temperature during charging are sensed and the charging current increased when temperature rises and decreased when temperature falls. Charging continues to a potential limit which is independent of temperature.

7 Claims, 6 Drawing Figures

CHARGING OF ALKALINE STORAGE BATTERIES

This invention relates to a method of charging alkaline storage batteries up to a predetermined limiting charge potential.

Especially for the charging of gas-tight batteries the invention establishes an optimum charging, which will be described here after.

For the charging of storage batteries, the most varied charging methods are known, the charging method being also particularly adapted to the specific construction of the storage battery. For example, gas-tight Nickel-Cadmium batteries with sinter electrodes are customarily charged either at constant current (I-characteristic) or with decreasing current (W-characteristic). When constant current is used this usually lies in the region of $I_{10}$ to $10\ I_{10}$. In charging with descreasing current the current decreases for example for $1{,}5\ I_{10}$ to $0{,}9\ I_{10}$. (By $I_{10}$ is meant that current for which the fully charged storage battery discharges its rated capacity in 10 hours at standard temperature. Therfore, for a storage battery with a nominal capacity of 15 Ah, the $I_{10}$ equals $1{,}5$ A).

Termination of charging also takes place in accordance with the most varied methods in response to one ore more perameters derived from the storage battery. For example, control action to terminate the charging may be accomplished in response to storage battery potential, in response to an increase in storage battery potential, or in response to special auxiliary electrodes within the storage battery. Alternatively, ampere-hour meters (coulometers) are connected with the storage battery or a time limiting of the charging takes place under manual control.

Most widespread is control of charging in response to charge potential. There, the charging continues up to a charge limit potential which is so selected that excessive gasing of the storage battery and resultant pressure rise and overheating are averted. This charge limit potential must also always be below the potential at which hydrogen evolution takes place inside the cell. For gas-tight, alkaline nickel/cadmium storage batteries with sinter electrodes, this potential limit normally lies at standard ambient temperature just below 1.6 volts per cell.

The charging process of a storage battery is dependent upon the reaction rate of the electrode masses which are to be transformed. Of decisive influence on this is the intensity of the current and the operating temperature of the cell.

At ambient temperature of 20° C. and at cell temperatures which are only slightly higher, good charging results can be achieved with charging currents in the region from about $2J_{10}$ to $J_{10}$ and using charge factors of about 1.2 to about 1.4. That is, the rated capacity is reached during subsequent discharge of the cell. In this case, the charging times lie between about 7 hours (when charging at $2J_{10}$) and 14 hours (when charging at $J_{10}$ and charge factor of 1.4).

If the charging current is increased at ambient temperature substantially above $2J_{10}$, then the above-mentioned voltage limit of 1.6 volts per cell is sometimes reached even before the rated capacity is charged and the charging must therefore be stopped prematurely. That is, only partial charging is achieved and during subsequent discharging the cell delivers a discharge capacity which is correspondingly less than its rated capacity.

At temperatures below 20° C., the cell potential, with charging currents in the order of magnitude of $2J_{10}$ to $J_{10}$, rises the faster, the lower the temperature. For example, at $-10°$ C., the potential limit of 1.6 volts per cell is reached already when only a partial charge of about 80% has been achieved. Conversely, during charging with the same currents at higher temperatures, e.g. $+40°$ C., a potential of about 1.45 volts will not be exceeded no matter how long the charging is continued. For these reasons, the charging at the above-mentioned charging currents is terminated at $-10°$ C. just below a potential limit of 1.6 volts per cell and at $+40°$ C. at a charge potential limit of less than 1.45 volts per cell. The straight line passing through these two inflection points has a slope of $-3.75$ to $-3.33$ mV per degree centigrade, that is the terminal potential decreases with increasing temperature.

At high temperatures the charge potential increase of the storage batteries becomes difficult to detect toward the end of charging. Therefore, reduced terminal potential must be used for safe termination. However, this leads to premature termination of charging at high temperatures. As a result, the quantity of current introduced through charging at higher ambient temperatures is always lower than at standard temperature.

Moreover, when charging with charging current of $2J_{10}$ to $J_{10}$ in higher temperature regions, there is an increasing worsening of charging efficiency, i.e. of the capacity for accepting charge (relationship of electrochemically stored charge quantity: introduced charge quantity). This contributes to further raising of cell temperature and thereby to more premature termination of charge acceptance.

It is generally true that reduced charging efficiency and consequent temperature rise constitute a waste of electrical energy and, moreover, these reduce the life expectancy of the cells. An optimal charging efficiency, having a value of more than 0.9, is therefore always a desirable objective.

A worsening of the charging efficiency below 0.9 always takes place in the terminal phase of charging. It manifests itself by the above-mentioned rise of cell temperature. This temperature effect is therefore correspondingly utilized for charge control by providing the cells with temperature sensors which reduce or turn off the charging current at preddetermined temperature limits. By charging current reduction, the charging may be continued; however, experience has shown that this leads to worsening of charging efficiency and specifically reduced but continued rise of cell temperature. Furthermore, charging which is continued in this manner leads only to partial utilization of cell capacity. Even known techniques which utilize temperature sensors to measure the rate of change of cell temperature and which charge with constant rapid charge current until this rate of change reaches a predetermined limit, after which they turn the charging current off or reduce it, do not really take into account the requirements of the cells and also yield only partial charging.

Accordingly, it is a primary object of the invention to provide a method for accelerated charging which yields nearly complete charging of the storage battery with high charging efficiency.

It is another object to provide such a method which is effective over a wide temperature range, particularly over a temperature range of approximately −10° C. to +45° C.

These and other objects of the invention are achieved by varying the charging current in the same sense as the cell temperature so that it increases with rising temperature and decreases with falling temperature.

The predetermined charging potential limit, or turn-off potential is dependent upon the construction of the storage battery which is being utilized. As usual it always lies below the potential at which hydrogen evolution would take place and preferably in the region of about 1.55 V per cell. Naturally, it is also possible to compensate the charge potential limit or turn-off potential at increasing temperatures by means of a negative temperature coefficient.

Thus, the charging takes place in accordance with the invention in such a way that, at standard temperature, a charging current is established which is suitable for accelerated charging of the storage battery. This is a current which charges the storage battery in about 3 to 5 hours, e.g. with a current which may for example be between 3.5 and $2I_{10}$. Turning off of the charging takes place in response to reaching of the charge potential limit. In accordance with the invention, the charging current is increased for increased cell temperature and decreased for reduced cell temperature. The amount by which the current must be increased for a given rise in cell temperature is determinable from the characteristic curves of the storage battery and is arrived at empirically for each storage battery type.

For example, in order to determine this value, the charge potential characteristics $U_L$ are plotted as a function of the capacity charge for various currents and at constant temperature.

Figure 6:
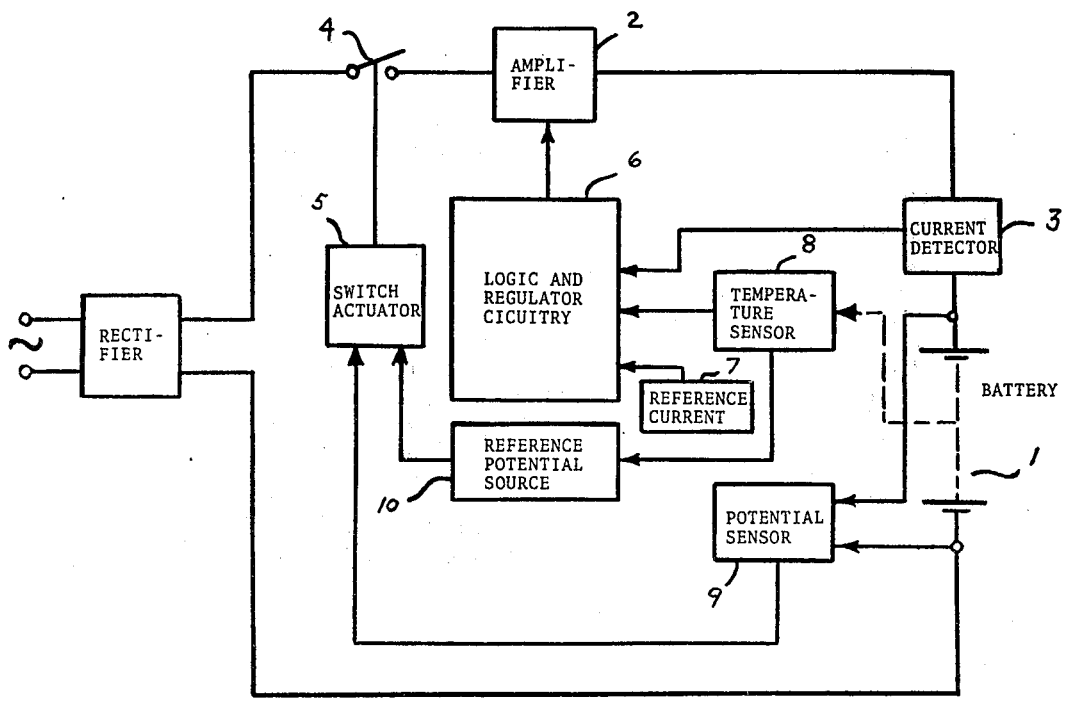

For further details, reference is made to the discussion which follows, in the light of the accompanying drawings, wherein FIGS. 1 through 5 show various characteristic curves helpful in explaining the method of the invention; and FIG. 6 is a block diagram of apparatus suitable for practicing the method.

Accordingly, FIG. 1 plots the charging potential $U_L$ (in volts) as a function of the introduced charge quantity C in ampere-hours for a gas-tight alkaline storage battery with sinter plate electrodes and a rated capacity of 15 ampere hours. Next to the capacity values there is also indicated the corresponding attained percentage of rated capacity (NK). This storage battery is charged with various currents i1 to i4, for example corresponding to 10 amperes, 3 amperes, 1.5 amperes, 0.75 amperes, at a constant temperature of $\theta = -10°$ C.

It is apparent that upon charging up to a turn-off potential $U_A$ of 1.55 V with a high current of i1=10A only about 50% of rated capacity is charged. At a current of i3=1.5 A about 80% of rated capcity is charged (this current corresponds to conventional charging current of $I_{10}$). At a further reduced current of i4=0.75 A, 110% rated capacity is charged.

Figure 2:
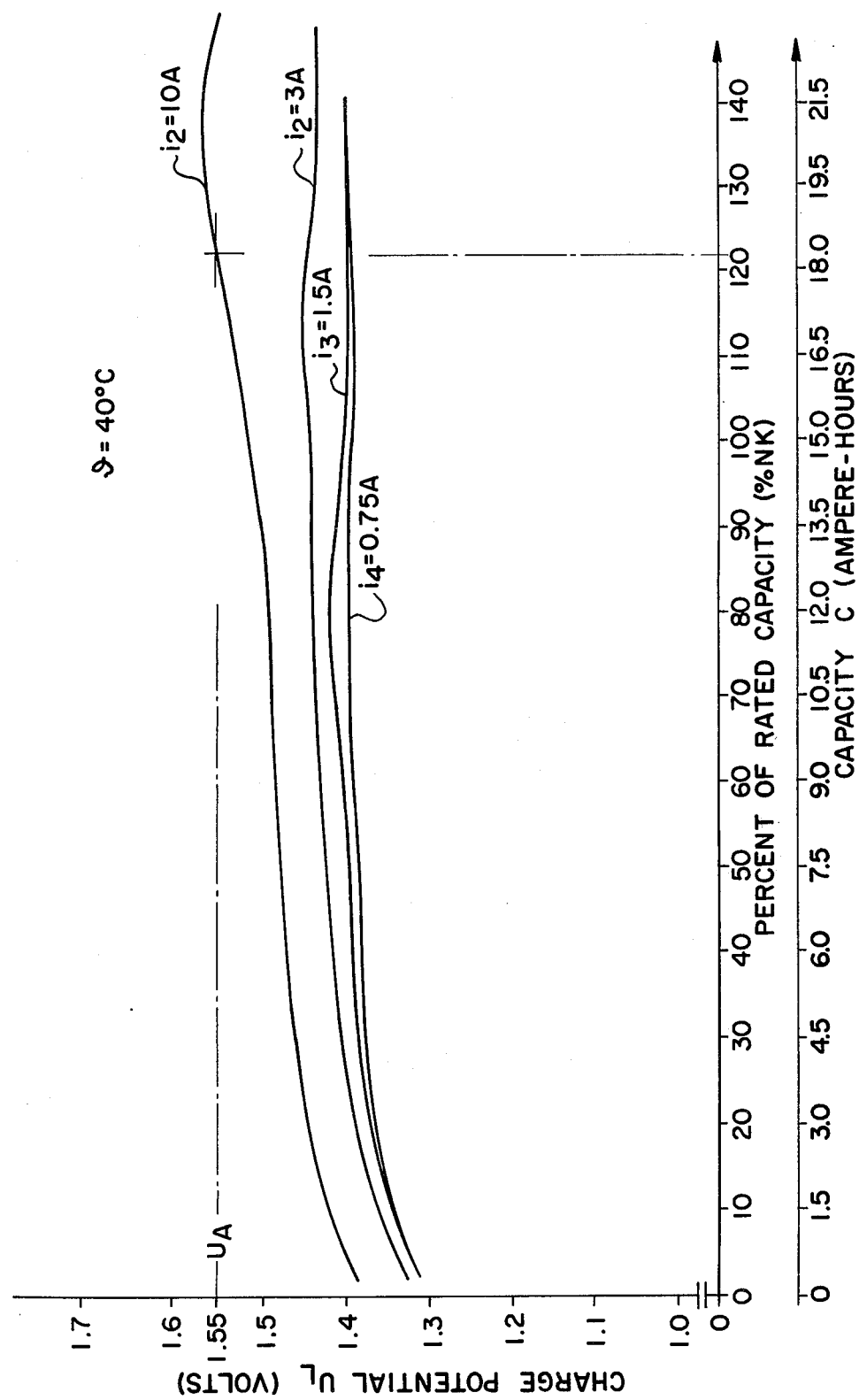

FIG. 2 shows the same set of characteristic curves for charging at a constant temperature of 40° C. It is apparent that with the conventional currents the turn-off potential will not be reached even with long charging duration. On the other hand, at an increased current of i1=10A and a turn-off potential of 1.55 volts, about 120% of rated capacity will be reached.

Figure 3:
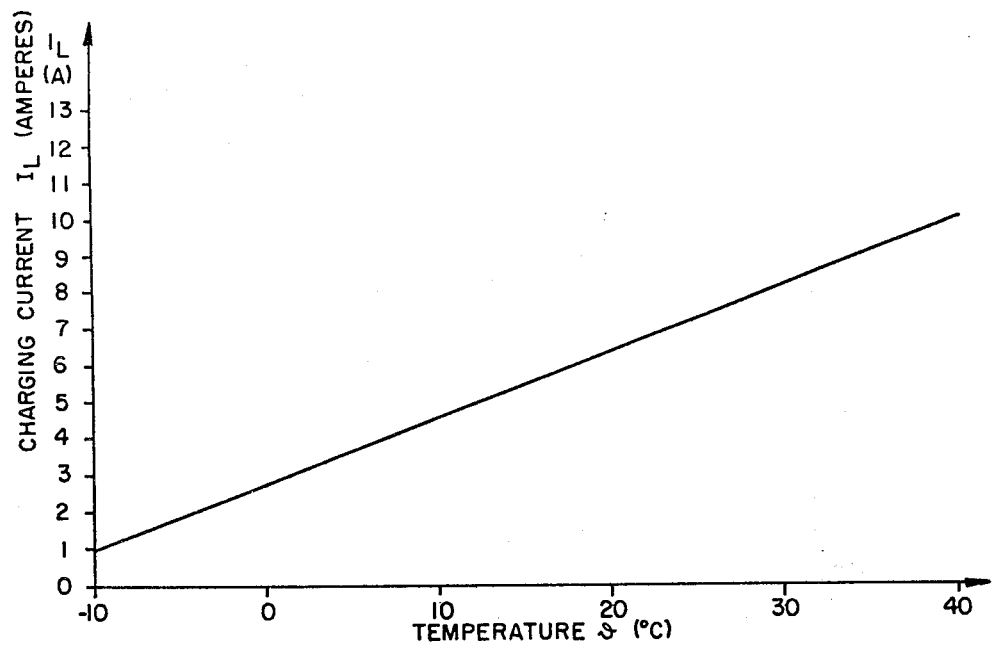

If corresponding characteristics are plotted for still other temperatures and in each case there is determined the current value at which for a turn-off potential ($U_A$) of 1.55 volts per cell a charged capacity of about 110 to 120% of rated capacity is achieved, then from these values there can be plotted the relationship of charging current $I_L$ (A) to temperature ($\theta$) as shown in FIG. 3. This dependence of charging current upon temperature must then be taken into account in the charging equipment. For a gas-tight sinter plate cell having rated capacity of 15 Ah there exists a temperature coefficient of about +0.18 ampere per degree.

Figure 4:
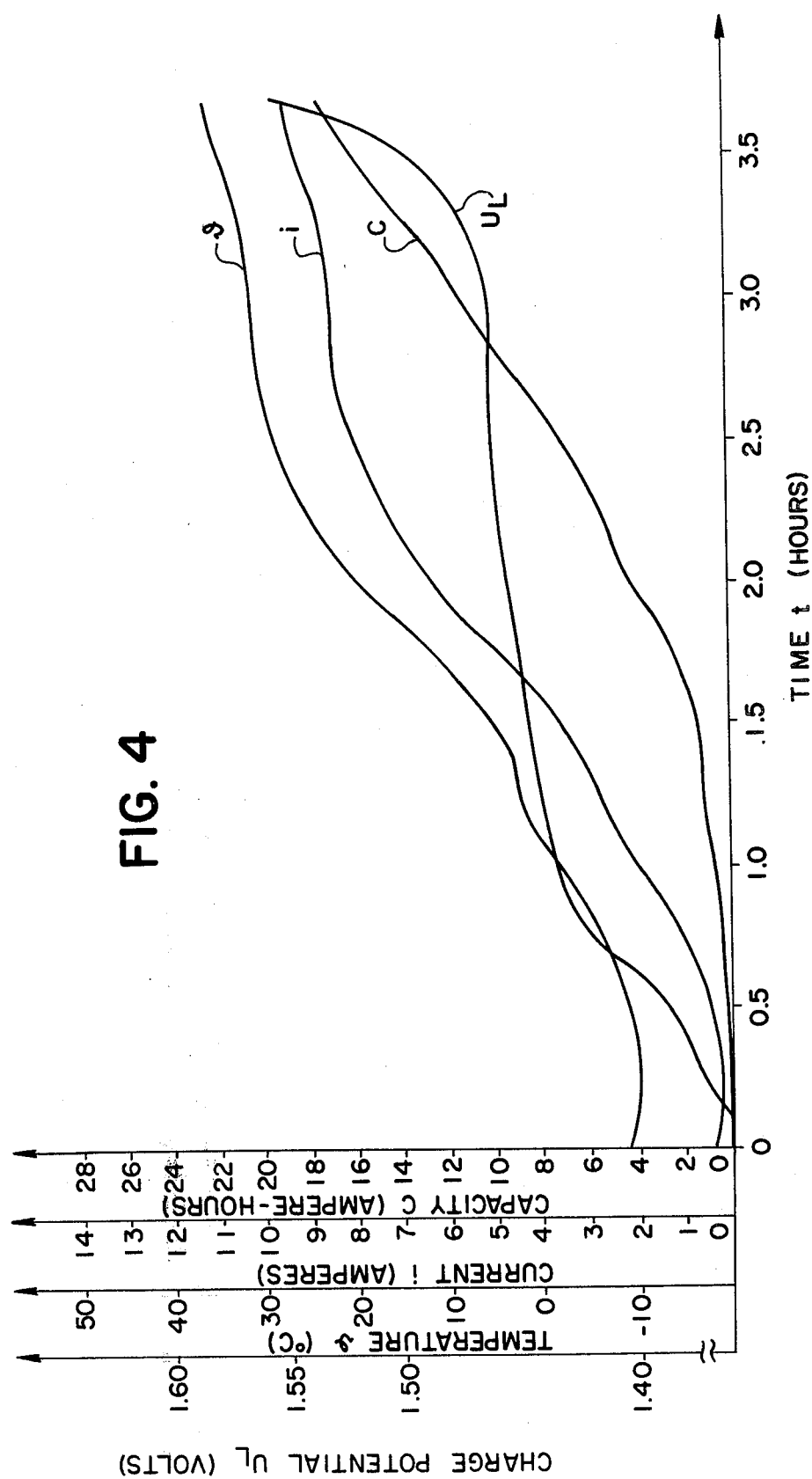

If a storage battery is charged in accordance with this regime, then there is achieved, as shown in FIG. 4, at a temperature which rises from 0° to about 40° a current i=f(t) which rises almost continuously with temperature and there is achieved, within a period which amounts to about 3.5 hours, a capacity of about 120% of rated capacity. The charge potential $U_L$ exhibits the desired rapid increase at the end of the charging process.

Figure 5:
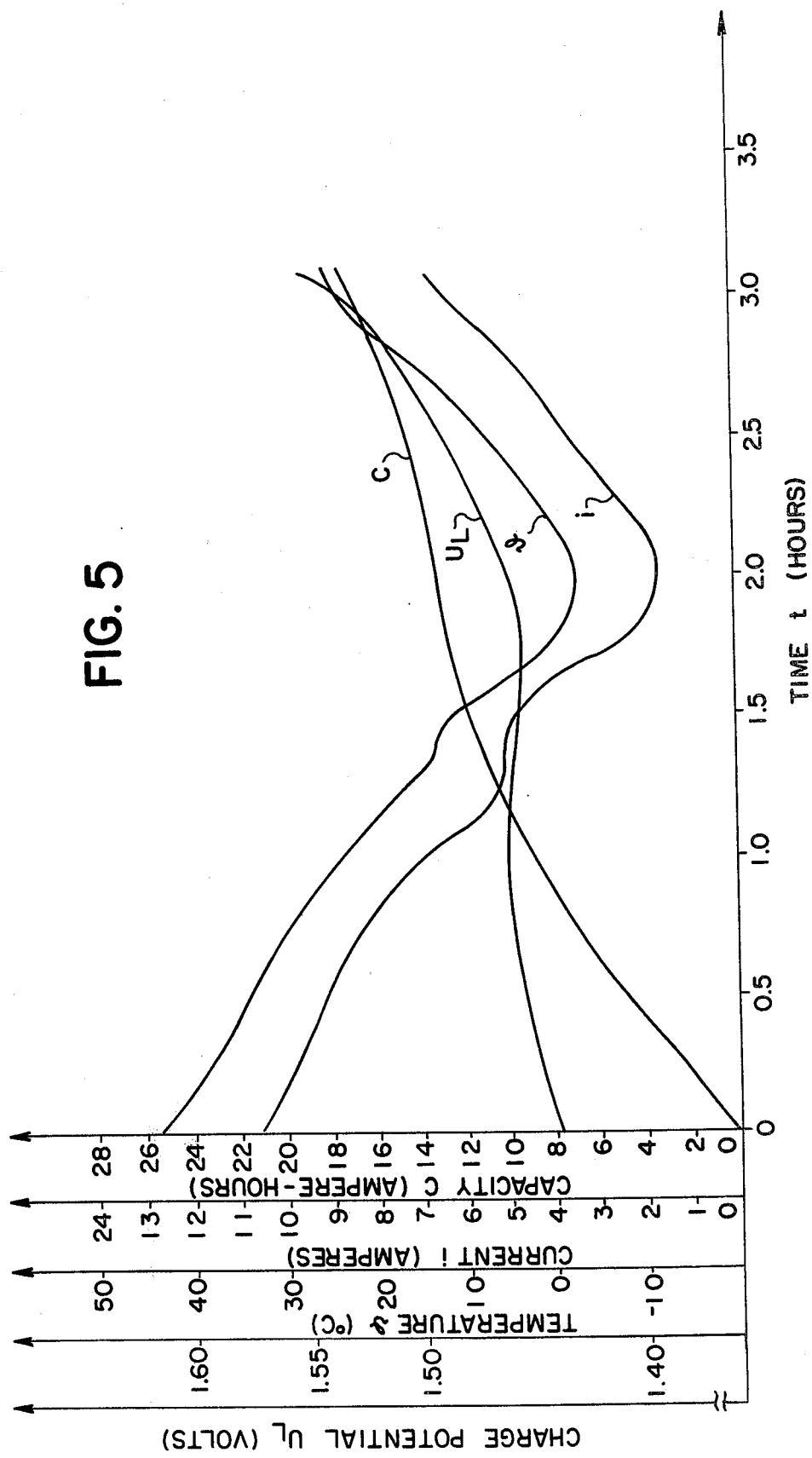

In FIG. 5 there are shown the corresponding curves for a temperature variation in which the temperature falls from about 40° C. to about −5° C. and then again rises continuously. Here, too, a capacity of about 120% of rated capacity is achieved in the short charge time of about 3 hours.

Similar curve shapes and similar charge quantities are also achieved for temperature which first rises and then falls again or for continuously falling temperature of the storage battery during charging. Therefore it is possible, despite pronounced variations in ambient temperature or cell temperature to provide accelerated charging within a short time period while also bringing the storage battery into a good state of charge. Surprisingly, it has been observed that improved charging of the storage battery at increased temperature can be achieved by increasing the charge current and at lower temperature by reduction of the charge current. The method embodying the invention has the effect that charging of the storage battery may be continued up to a fixed turn-off potential or up to one which declines only very slightly with rising temperature. Moreover, optimal utilization of cell capacity becomes possible over the whole temperature range. Exceeding of the upper charge potential limit prior to complete charging of the storage battery is averted. This leads to complete utilization of cell capacity over the entire temperature range. Toward the end of the charging process there always occurs a significant rise in potential and there is therefore available an unambiguous signal for terminating the charging. It is possible to work with a fixed charge limit potential and this prevents premature turning off of charging in older cells due to too low a charge limit potential. In accordance with the regime embodying the invention, the charging continues until the turn-off potential is reached with an efficiency which exceeds 90%. As a result, unnecessary heating of the cells does not occur and gentle battery treatment prevails. It is also not necessary to work with charge factors which exceed 1.1. This also reduces the production of heat within the cells and saves energy.

In the method embodying the invention, it is not essential to work with a continuous charging current. Rather, the charging current can also be introduced into the storage battery in the form of charge current pulses.

FIG. 6 diagrammatically illustrates by means of a block diagram a charging equipment for carrying out the charging method embodying the invention.

This equipment includes, connected in circuit with battery 1, an amplifier 2 and an actual current value detector 3, as well as a switch 4 operable by means of turn-off switch actuator 5. The acutal value of the current is compared via a logic and regulator circuit 6 with a reference value established by circuit 7. Determination of the reference value takes place in response to a temperature sensor 8. Turn-off takes place in response to potential sensor 9 and the turn-off means 4, 5. If desired, the reference potential value is modified in known manner by a reference potential source 10 controlled by the temperature sensor 8.

We claim:

1. The method of charging a gas-tight storage battery which is subject to cell temperature changes during charging comprising the steps of:

sensing the changes in temperature, controlling the intensity of the charging current progressively in the same sense as the temperature changes, so that the charging current becomes progressively more intense at higher temperatures and progressively less intense at lower temperatures, and terminating the charging in response to attainment by the battery potential of a predetermined potential and independently of temperature.

2. The method of claim 1 comprising the further steps of:

empirically determining the relationship between charging current and temperature for the battery type; and utilizing the relationship to determine the control relationship between changes in temperature and intensity of charging current.

3. The method of claim 2 wherein the charging current intensity is controllable between about $10J_{10}$ and $0.5J_{10}$ amperes.

4. The method of claim 2 wherein the temperature is subject to changes between about $-10°$ C. and $+45°$ C. and the variation in charging current takes place progressively throughout said temperature changes.

5. Charging apparatus for a gas-tight storage battery which is subject to cell temperature changes during charging, comprising:

means for producing battery charging current of controllable intensity;

means for sensing the cell temperature changes and controlling the current intensity progressively in the same sense as the cell temperature changes, whereby the current intensity becomes progressively higher at higher temperatures and progressively lower at lower temperatures; and means for terminating the charging in response to attainment of a predetermined potential by the battery.

6. The apparatus of claim 5 characterized in that the charging terminating means is insensitive to the changes in temperature.

7. Method of charging gas-tight storage batteries with a charging current which depends upon cell temperature up to a predetermined terminal charging potential, wherein the charging current is at least a 20-hour charging current at a cell temperature of $-10°$ C., increases with a temperature coefficient of approximately 0.18 amperes per degree during increase of cell temperature to $45°$ C., while decreasing with substantially the same temperature coefficient during decrease of cell temperature.

* * * * *